(12) United States Patent
Kawai (10) Patent No.: US 12,524,263 B2
(45) Date of Patent: Jan. 13, 2026

(54) INFORMATION PROCESSING APPARATUS, CONTROL METHOD, AND PROGRAM FOR TRANSITION BETWEEN TWO APPLICATIONS

(71) Applicant: CANON KABUSHIKI KAISHA, Tokyo (JP)

(72) Inventor: Ryoya Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/119,551

(22) Filed: Dec. 11, 2020

(65) Prior Publication Data

US 2021/0096905 A1 Apr. 1, 2021

Related U.S. Application Data

(63) Continuation of application No. 15/074,877, filed on Mar. 18, 2016, now abandoned.

(30) Foreign Application Priority Data

Mar. 20, 2015 (JP) .................................. 2015-057753

(51) Int. Cl.
*G06F 9/48* (2006.01)
*G06F 9/54* (2006.01)
*H04N 1/00* (2006.01)

(52) U.S. Cl.
CPC .............. *G06F 9/4806* (2013.01); *G06F 9/54* (2013.01); *H04N 1/00307* (2013.01); *H04N 1/00941* (2013.01)

(58) Field of Classification Search
None
See application file for complete search history.

(56) References Cited

U.S. PATENT DOCUMENTS 7,120,914 B1 * 10/2006 Manthos ................. G06F 16/94
 719/329
7,322,013 B1 * 1/2008 Benson ................... G06F 9/543
 715/837
7,512,952 B1 * 3/2009 Liu .......................... G06F 9/485
 718/107

(Continued)

*Primary Examiner* — Irete F Ehichioya
*Assistant Examiner* — Phoebe X Pan
(74) *Attorney, Agent, or Firm* — Canon U.S.A., Inc., IP Division (57) ABSTRACT

An information processing apparatus on which a plurality of applications is able to operate, the information processing apparatus comprising: an identifying unit configured to identify, on a first screen, an instruction of a transition to a second application, the first screen being provided by a first application; and a transmitting unit configured to transmit a transition information if the instruction of the transition is identified, the transition information including launcher information of the second application and identification information for identifying the first application, wherein a second screen is provided on a display unit based on the launcher information by the second application and the object is displayed on the second screen based on launcher information of the first application which is generated based on the identification information by the second application, and wherein if the object is selected, the first screen being provided by the first application is displayed.

22 Claims, 10 Drawing Sheets

(56) References Cited

U.S. PATENT DOCUMENTS

| | | | | |
|---|---|---|---|---|
| 8,745,018 B1* | 6/2014 | Singleton | | G06F 3/048 707/705 |
| 8,745,168 B1* | 6/2014 | Singleton | | G06F 16/951 709/219 |
| 9,766,952 B2* | 9/2017 | Mandic | | G06F 9/461 |
| 9,891,811 B2* | 2/2018 | Federighi | | G06F 3/0488 |
| 10,002,113 B2* | 6/2018 | Glover | | G06F 16/9537 |
| 10,346,030 B2* | 7/2019 | Wells | | G06F 3/0416 |
| 2003/0016241 A1* | 1/2003 | Burke | | G06F 16/958 707/E17.116 |
| 2004/0132445 A1* | 7/2004 | Rogalski | | H04M 1/72502 455/426.1 |
| 2005/0091400 A1* | 4/2005 | Hartley | | G06F 9/451 709/219 |
| 2007/0283292 A1* | 12/2007 | Bucher | | G06F 3/0482 715/810 |
| 2009/0307105 A1* | 12/2009 | Lemay | | G06F 3/04842 715/810 |
| 2009/0327953 A1* | 12/2009 | Honkala | | G06F 3/04817 715/804 |
| 2011/0292428 A1* | 12/2011 | Ishii | | H04N 1/00416 358/1.13 |
| 2011/0310431 A1* | 12/2011 | Uchikawa | | H04N 1/00503 358/1.15 |
| 2013/0325341 A1* | 12/2013 | Van Os | | G06T 17/05 701/533 |
| 2014/0089947 A1* | 3/2014 | Han | | G06F 9/54 719/328 |
| 2014/0201660 A1* | 7/2014 | Clausen | | G06F 3/04883 715/769 |
| 2015/0046848 A1* | 2/2015 | Vohra | | H04M 1/72436 715/760 |
| 2015/0058869 A1* | 2/2015 | Mandic | | G06F 9/461 719/328 |
| 2015/0169071 A1* | 6/2015 | Jitkoff | | G06F 3/017 715/863 |
| 2015/0193267 A1* | 7/2015 | Shafer | | G06F 9/468 719/320 |
| 2015/0207854 A1* | 7/2015 | Aiello | | G06F 16/951 709/203 |
| 2016/0062635 A1* | 3/2016 | Feit | | G06F 9/485 715/765 |
| 2019/0361737 A1* | 11/2019 | Hu | | G06F 9/44526 |

* cited by examiner

INFORMATION PROCESSING APPARATUS, CONTROL METHOD, AND PROGRAM FOR TRANSITION BETWEEN TWO APPLICATIONS

CROSS-REFERENCE TO RELATED APPLICATIONS

This application is a continuation of U.S. patent application Ser. No. 15/074,877, filed on Mar. 18, 2016, which claims the benefit of Japanese Patent Application No. 2015-057753, filed Mar. 20, 2015, all of which are hereby incorporated by reference herein in their entirety.

BACKGROUND OF THE INVENTION

Field of the Invention

The present invention relates to an information processing apparatus that uses a plurality of applications such as a mobile terminal, a control method, and a program.

Description of the Related Art

It is known that an information processing apparatus can be used by installing a plurality of application thereon. Hence, there is proposed a method of displaying a list of transitionable applications so that a direct transition can be made from an operation screen of one application to an operation screen of another application (Japanese Patent Application Laid-Open No. 2014-56592).

However, in Japanese Patent Application Laid-Open No. 2014-56592, when a user wants to return to an application that is a transition source, he/she needs to select a button indicating the application that is the transition source from a list of applications. Namely, in order for the user to return to the application that is the transition source, he/she needs to remember the application that is the transition source. Thus, the larger the number of applications available, the larger the user's burden. In addition, to display a list of transitionable applications, a corresponding screen display area is required. Thus, there is another problem that an ideal image display size increases.

SUMMARY OF THE INVENTION

To solve problems such as those described above, an information processing apparatus of the present invention is an information processing apparatus on which a plurality of applications is able to operate and which includes an identifying unit configured to identify, on a first screen, an instruction of a transition to a second application, the first screen being provided by a first application; and a transmitting unit configured to transmit a transition information if the identifying unit identifies the instruction of the transition, the transition information including launcher information of the second application and identification information for identifying the first application, wherein a second screen is provided on a display unit based on the launcher information by the second application and the object is displayed on the second screen based on launcher information of the first application which is generated based on the identification information by the second application, and wherein if the object displayed on the second screen is selected, a first screen being provided by the first application is displayed.

Further features of the present invention will become apparent from the following description of exemplary embodiments (with reference to the attached drawings).

DESCRIPTION OF THE EMBODIMENTS

Information processing apparatuses according to the present invention will be described in detail below with reference to the drawings. Note that the following embodiments are not intended to limit the present invention recited in the claims, and all combinations of features described in the embodiments are not necessarily essential to the solving means of the present invention.

First Embodiment

In the present embodiment, a mobile terminal 100 will be described as an example of an information processing apparatus. Examples of the mobile terminal 100 include a personal information terminal such as a PDA (Personal Digital Assistant), a mobile phone, and a smartphone. Note that the information processing apparatus is not limited to a mobile terminal apparatus and may be any apparatus as long as the apparatus requires a screen transition between applications. In the present embodiment, a smartphone is used as an example of the mobile terminal. The smartphone refers to a multifunctional mobile phone equipped with a camera function, an Internet browser function, an email function, etc., in addition to a mobile phone function.

Figure 1A:
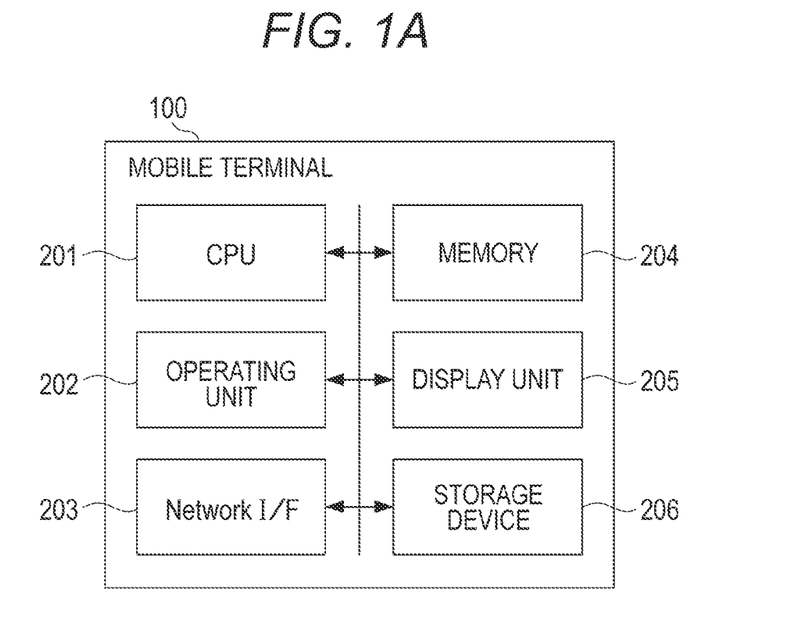
FIGS. 1A and 1B are diagrams showing configurations of an information processing apparatus according to a first embodiment.
Figure 1B:
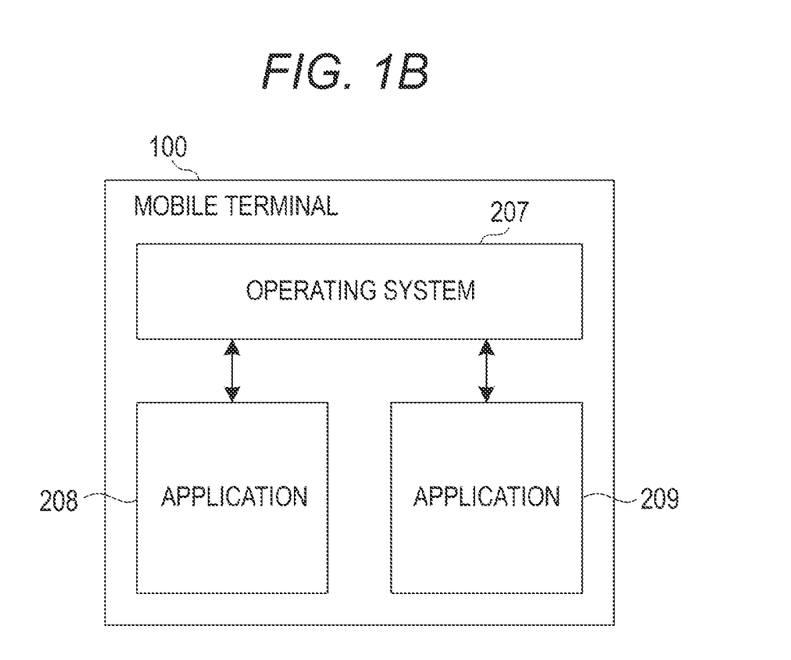

FIGS. 1A and 1B are diagrams showing configurations of the mobile terminal 100. FIG. 1A shows a hardware configuration of the mobile terminal 100, and FIG. 1B shows a software configuration of the mobile terminal 100. The mobile terminal 100 includes a CPU 201, an operating unit 202, a network interface 203, a memory 204, a display unit 205, and a storage device 206, which are connected to each other through a system bus. The CPU 201 performs overall control of the mobile terminal 100. The operating unit 202 is an operating unit used by a user to provide instructions to the mobile terminal 100. The operating unit 202 includes, for example, buttons, a touch panel, etc. The memory 204 is a random access memory (RAM) serving as a work area of the CPU 201. The memory 204 is used as a temporary storage area for various received data, or stores various types of setting data. The storage device 206 is, for example, a flash memory and stores various types of control programs such as applications and an operating system. The mobile terminal 100 is configured to be connectable to a network through the network interface 203 and connectable to external devices such as a printer or the Internet through the network. The display unit 205 is a display unit that displays various types of information, and is composed of a liquid crystal panel, etc. Though details will be described later, the display unit 205 can display one of a plurality of applications installed on the mobile terminal 100.

As shown in FIG. 1B, the mobile terminal 100 includes an operating system (hereinafter, referred to as OS) 207 and a plurality of applications (an application 208 and an application 209). Namely, each of the plurality of applications can operate on the mobile terminal 100. The application 208 and the application 209 operate through the OS 207. These pieces of software are stored in the storage device 206, and are expanded in the memory 204 and executed by the CPU 201. In addition, the application 208 and the application 209 each have launcher information. By the application 208 transmitting, in a predetermined format, transition information for transitioning to the application 209 to the OS 207, the OS 207 allows the application 209 to launch. Note that the number of applications included in the mobile terminal 100 is not limited to two and may be three or more. Note also that each application included in the mobile terminal 100 is installed, for example, through a network.

Figure 2A:
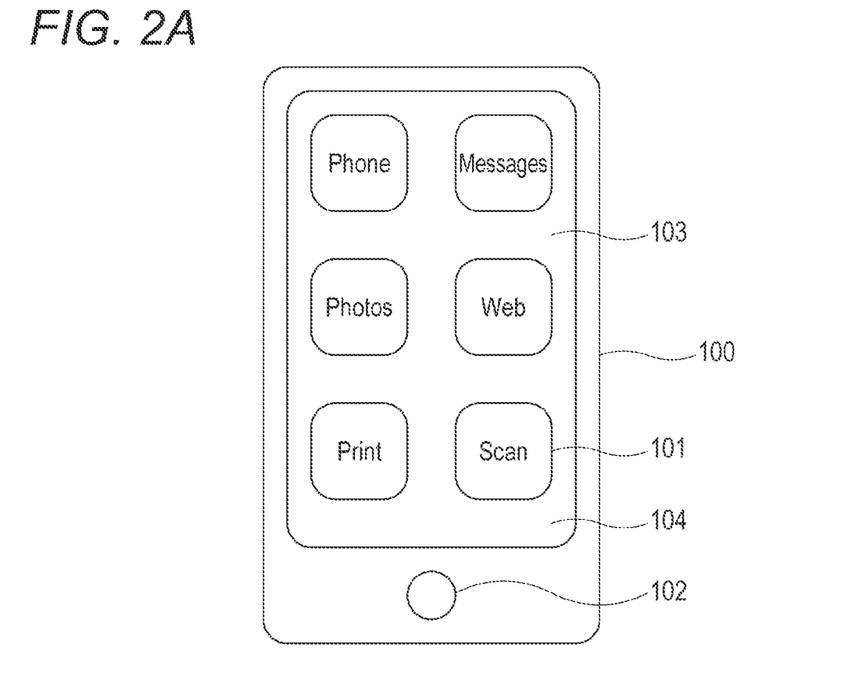
FIGS. 2A and 2B are diagrams showing display screens of the information processing apparatus according to the first embodiment.

FIG. 2A is a diagram showing a display screen displaying, by a display unit 103 of the mobile terminal 100, a list of applications installed on the mobile terminal 100. The display unit 103 corresponds to the display unit 205 of FIG. 1A, and is composed of a display having a display mechanism of an LCD system. An operating unit 104 corresponds to the operating unit 202 of FIG. 1A. The operating unit 104 has an operating mechanism of a touch panel system, and detects depression performed by the user. Namely, in the present embodiment, a touch panel which is at least a part of the operating unit 104 is provided on the display unit 103 composed of an LCD. The display unit 103 displays GUI components such as icons 101. By the user operating a GUI component displayed, he/she can use a function provided by the GUI component. Here, each application is displayed in the form of the icon 101. By the user tapping an icon 101, the tapped application launches. Namely, by the user tapping the operating unit 104, an event corresponding to the tapped GUI component (also referred to as object) is issued.

In addition, the mobile terminal 100 includes a home button 102. By depressing the home button 102, a screen of a launching application is closed and the user can return to a display screen that displays a list of applications.

Figure 2B:
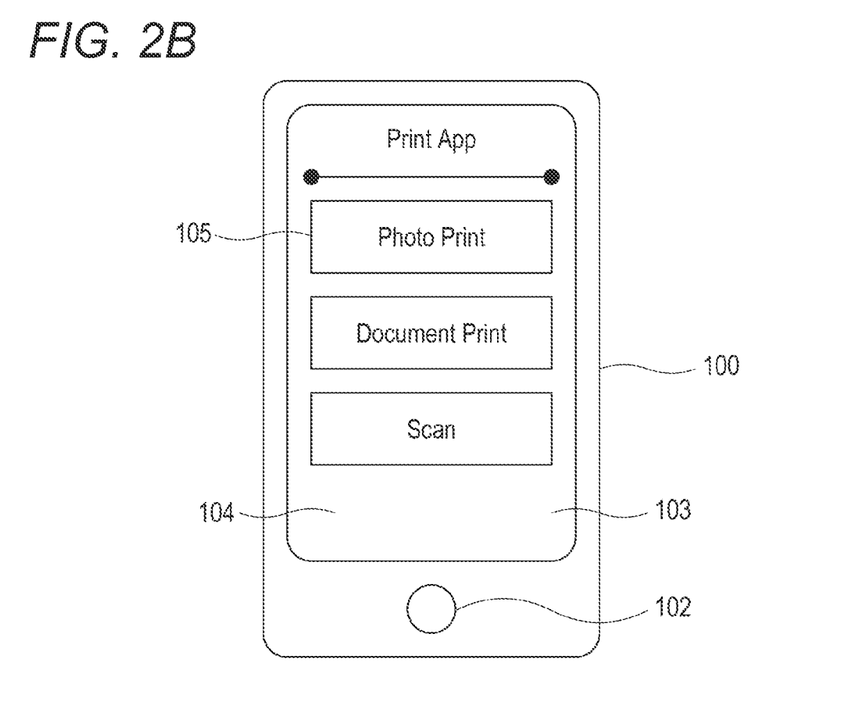

In addition, FIG. 2B is a diagram showing a screen displayed when the display unit 103 of the mobile terminal 100 is using one of the applications installed on the mobile terminal 100. Specifically, FIG. 2B is a diagram showing a screen provided by an application being used. The display unit 103 of FIG. 2B displays a screen for operating an external apparatus connected to the mobile terminal 100 through a network, etc. The screen has a plurality of objects 105 indicating the functions of the external apparatus. By the user tapping an object 105, he/she can use a corresponding function of the external apparatus.

Figure 3:
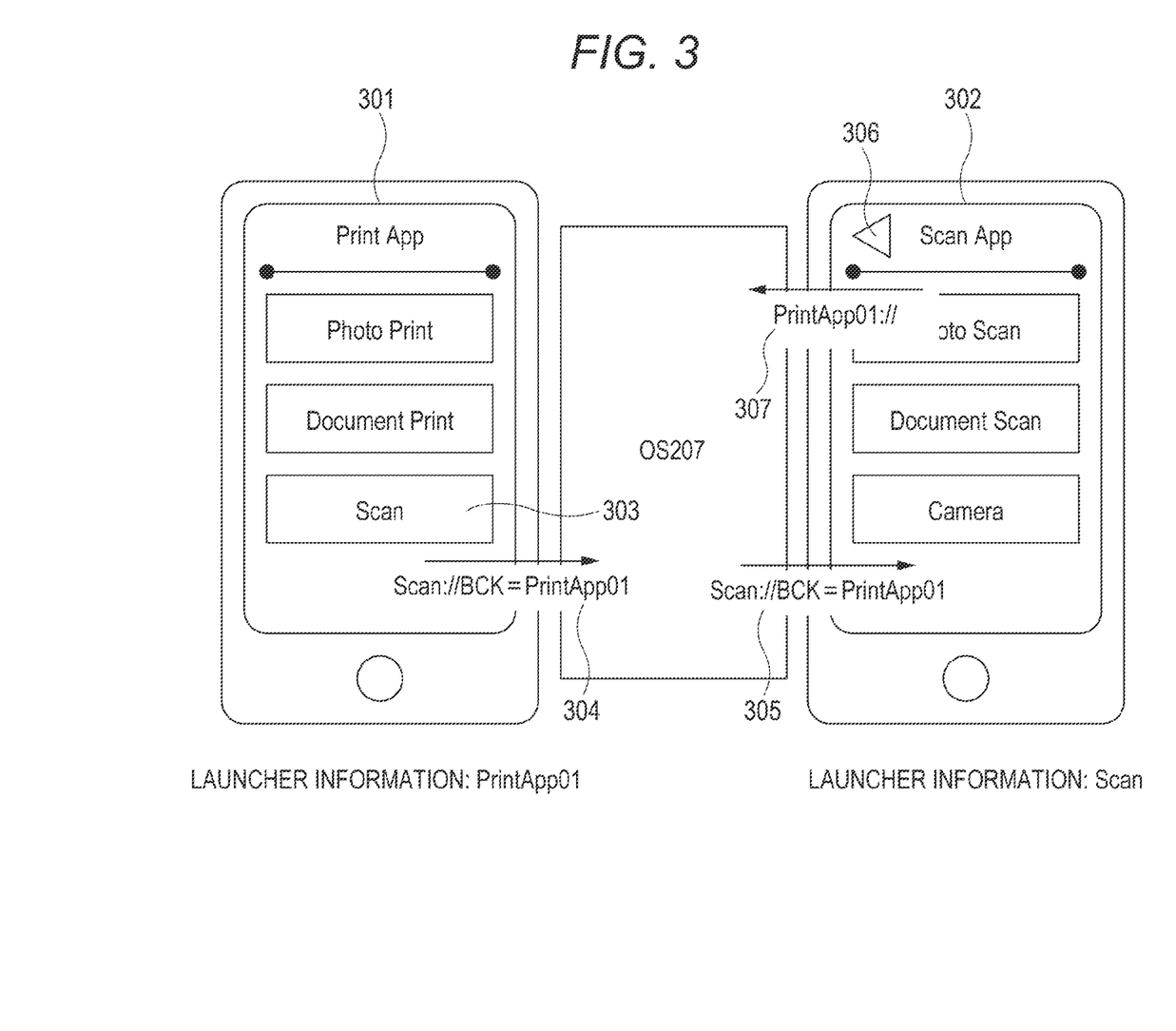
FIG. 3 is a diagram showing user operations and information to be given and received in the first embodiment.

In the present embodiment, the user can make a transition from an application that is a transition source (hereinafter, also described as "app 1") to an application that is a transition destination (hereinafter, also described as "app 2") and return to a screen 301 of the transition source app from a screen 302 of the transition destination app.

FIG. 3 is a diagram describing a screen transition between a transition source app and a transition destination app. Specifically, FIG. 3 is a diagram schematically showing user operations and information to be given and received between the transition source app and the transition destination app when the user operations are performed. Here, as an example, the case will be described in which the transition source app is a print application and the transition destination app is a scan application. When the user taps a button 303 for transitioning from the screen 301 provided by the app (app 1) being used on the mobile terminal 100 to the screen 302 provided by the app 2, transition information 304 for transitioning to the app 2 is generated. Specifically, when the app 1 identifies the fact that the button 303 for transitioning to the screen 302 has been tapped (selected), the app 1 combines launcher information of the app 2 and launcher information of the app 1 together in a predetermined format, and thereby generates the transition information 304 for transitioning to the app 2. In other words, in the present embodiment, the app 1 generates the transition information 304 including not only the launcher information of the app 2 which is the transition destination, but also the launcher information of the app 1.

Here, the launcher information is information for launching an app. Note that in FIG. 3 the launcher information of the app 1 is "PrintApp01" and the launcher information of the app 2 is "Scan".

The generated transition information 304 is transmitted as information 305 to the transition destination app via the OS 207 on the mobile terminal 100. At this time, the information 305 may be any as long as the information includes at least the launcher information of the app 1, and thus may be a part of the transition information 304 or may be the transition information 304 itself, or other information may be newly provided to a part or all of the transition information 304. Note that when the information 305 is not identical to the transition information 304, the information 305 is one that is newly generated by the OS 207.

The app 2 extracts the launcher information of the app 1 from the received information 305. The app 2 creates a link 306 for returning to the app 1, using the extracted launcher information of the app 1. The screen 302 of the app 2 displays the created link 306 thereon. In the present embodiment, as shown in FIG. 3, in order for the user to easily recognize a return to the transition source app, the display of the link 306 is a return button.

When the user taps the link 306 displayed on the screen 302 of the transition destination app, the app 2 identifies the fact that the link 306 has been selected, and thus, launcher information 307 of the app 1 is transmitted to the OS 207. By this, the display screen displayed on the display unit transitions from the screen 302 of the app 2 to the screen 301 of the app 1.

Figure 4:
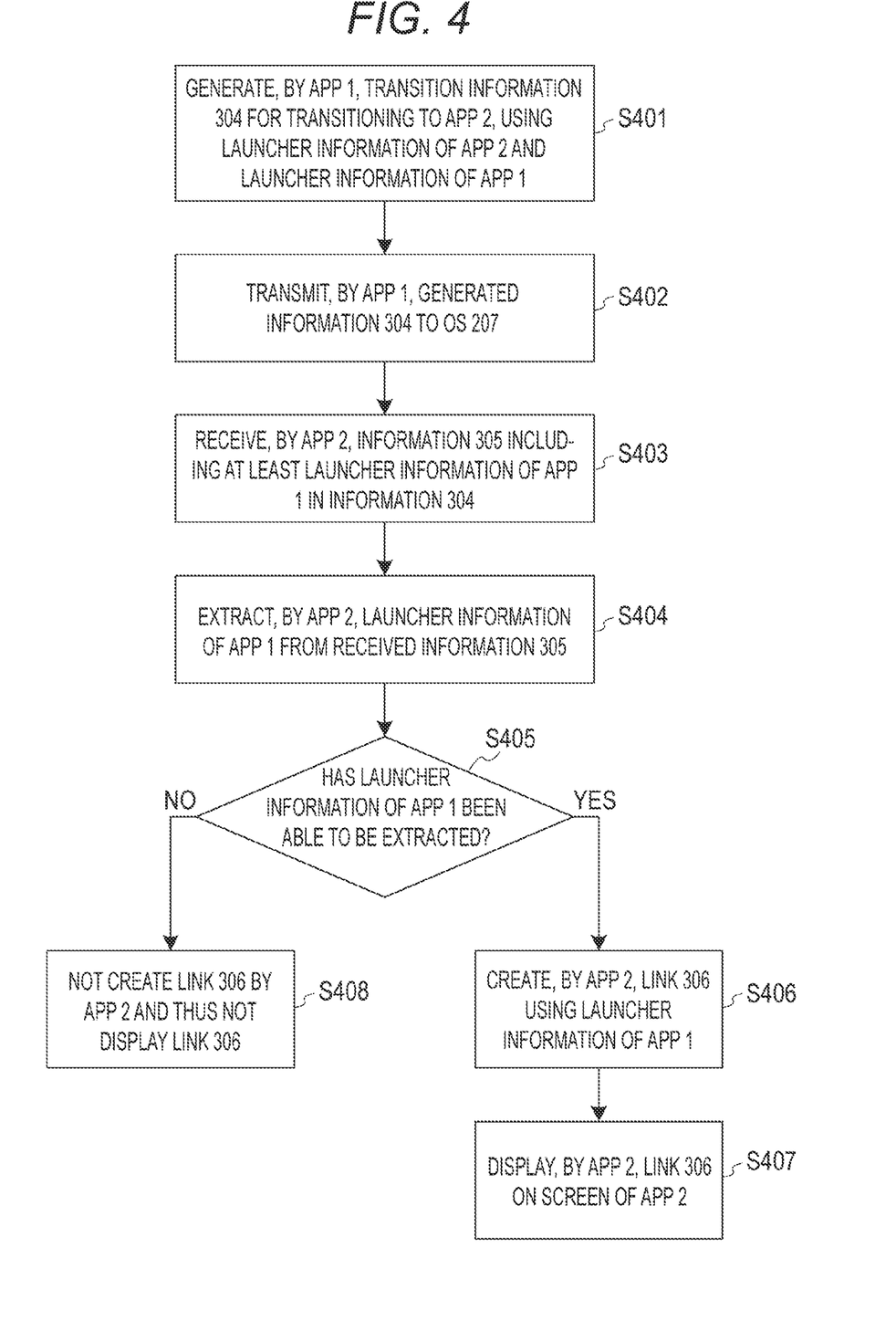
FIG. 4 is a flowchart showing processes of applications in the first embodiment.

FIG. 4 is a flowchart showing the flow of processes for displaying the link 306 for transitioning to the app 1 on the screen of the app 2, using the launcher information of the transition source app included in the information received by the app 2. The flowchart describes processes performed by the app 1 and the app 2 after the user taps the button 303 for transitioning to the app 2, which is displayed on the screen 301 provided by the app 1. Note that the CPU 201 performs the flowchart shown in FIG. 4 by loading an application program stored in the storage device 206 into the memory 204 and executing the application program.

First, at step S401, the app 1 generates transition information 304 for transitioning to the app 2, based on launcher information of the app 2 and launcher information of the app 1. Subsequently, at step S402, the app 1 transmits the generated transition information 304 to the OS 207.

At step S403, the app 2 receives information 305 including at least the launcher information of the app 1 in the transition information 304.

At step S404, the app 2 extracts the launcher information of the app 1 from the received information 305. At step S405, the app 2 determines whether the launcher information of the app 1 has been able to be extracted.

If it is determined that the launcher information of the app 1 has been able to be extracted (Yes at S405), the app 2 determines to create a link 306 and thus creates the link 306 for returning to the app 1, using the launcher information of the app 1 (step S406). Thereafter, processing proceeds to step S407, and the app 2 displays the link 306 for returning to the app 1 on a screen provided by the app 2.

Alternatively, if it is determined that the launcher information of the app 1 has not been able to be extracted (No at S405), processing proceeds to step S408, and the app 2 does not create a link 306 for returning to the app 1. Therefore, the link 306 is not displayed.

As described above, in the present embodiment, the app 1 that operates on the mobile terminal 100 transmits launcher information thereof to the app 2 via the OS 207, and the app 2 extracts the launcher information of the app 1, by which the link 306 for returning to the app 1 is displayed on a screen of the app 2. Then, when the user wants to return to the app 1 from the app 2, the user can return to the app 1 only by tapping the link 306 displayed on the screen provided by the app 2. For example, when the user depresses the home button 102 to select again an application that is a transition source on an app list screen, he/she needs to remember the application that is the transition source. On the other hand, in the present embodiment, the user does not need to remember a transition source application, and thus, usability can be improved. Namely, it facilitates a user operation for returning to a screen displayed before a transition when a screen transition is made from one application screen to another application screen.

In addition, since it is only necessary to display a link to the transition source on a part of the screen, the display area can be sufficiently used. For example, when a list of transitionable applications is displayed, a display area for the application list occupied on the display screen becomes large. On the other hand, in the present embodiment, by displaying a link to a transition source as an object (return button), a display area for a transition occupied on the display screen can be reduced. It is particularly preferable for devices with a small screen size (display area), such as mobile terminals.

Although the above-described embodiment describes the case of two applications, the configuration is not limited thereto, and the larger the number of applications, the more improvement in usability compared to conventional methods.

Second Embodiment

The first embodiment describes an example of returning to an app 1 from an app 2; however, in a device with a small amount of memory mounted thereon such as a smartphone, the process of the app 1 may be terminated by a system during use of the transition destination app 2. In this case, in the method of the first embodiment, when a user returns to the app 1 from the app 2, an initial screen of the app 1 is displayed. On the other hand, in the present embodiment, even when the app 1 is terminated by the system, a user operation can be seamlessly continued.

Now, using FIG. 5, the present embodiment will be described in detail. Note that the same components as those of the first embodiment are denoted by the same signs and overlapping description is omitted.

Figure 5:
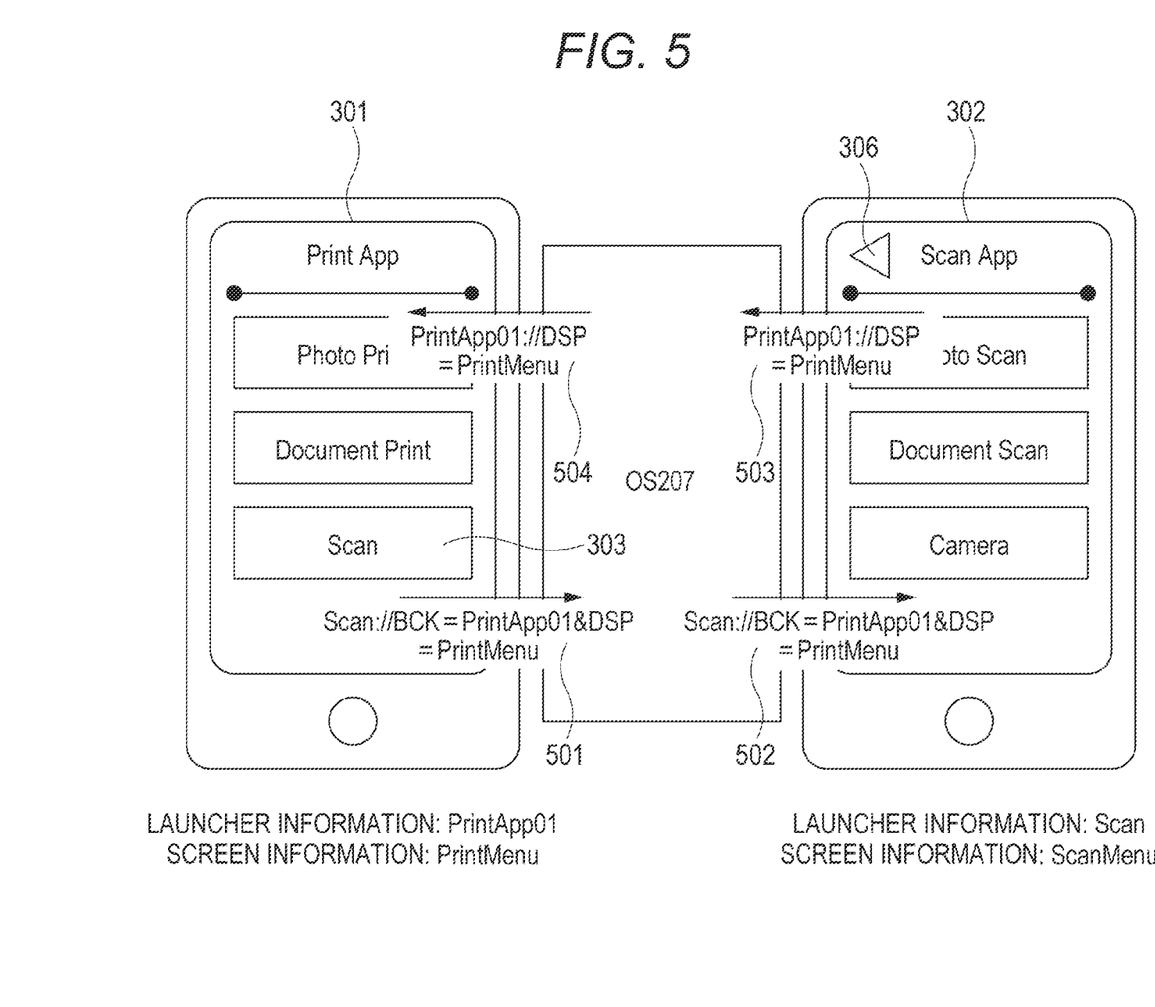
FIG. 5 is a diagram showing user operations and information to be given and received in a second embodiment.

FIG. 5 is a diagram describing a screen transition between a transition source app and a transition destination app in the present embodiment. Specifically, FIG. 5 is a diagram schematically showing user operations and information to be given and received between an app 1 and an app 2 when the user operations are performed. A user taps a button (object) 303 for transitioning from a screen 301 of the app 1 being used on a mobile terminal 100 to a screen 302 of the app 2. When the app 1 identifies the fact that the object 303 has been selected, the app 1 generates transition information 501 for transitioning to a transition destination app. Specifically, the app 1 combines launcher information of the app 2 and launcher information of the app 1 together in a predetermined format, and further provides state information indicating the current state of the app 1 (e.g., screen information or setting information), and thereby generates the transition information 501. In other words, in the present embodiment, the transition source app generates the transition information 501 including not only the launcher information of the transition destination app, but also the launcher information of the transition source app and the state information of the transition source app.

Note that in FIG. 5 the state information of the transition source app is the screen information "PrintMenu" and the state information of the transition destination app is the screen information "ScanMenu".

The generated transition information 501 is transmitted as information 502 to the app 2 via an OS 207 on the mobile terminal 100. The information 502 may be any as long as the information includes at least the launcher information of the app 1 and state information such as screen information/setting information for restoring the state of the app 1, and thus may be a part of the transition information 501 or may be the transition information 501 itself. Alternatively, other information may be newly provided to a part or all of the transition information 501. Note that when the information 502 is not identical to the transition information 501, the information 502 is one that is newly generated by the OS 207.

The app 2 extracts the launcher information, screen information/setting information, etc., of the app 1 from the received information 502 to create a link 306 for returning to a state that exists immediately before the app 1 transitions to the app 2. The screen 302 of the app 2 displays the created link 306 thereon. When the user taps the link 306 displayed on the screen 302 of the app 2, link information 503 generated by the app 2 is transmitted as transition information 504 to the app 1 via the OS 207, by which the display screen of the display unit transitions from the screen 302 of the app 2 to the screen 301 of the app 1. At this time, the app 1 extracts state information (screen information, setting information, etc.) indicating the state of the app 1 that exists immediately before transitioning to the screen 302 of the app 2, from the received transition information 504 to restore the state that exists immediately before transitioning to the screen 302 of the app 2.

Note that, though not shown, the app 2 can also transmit state information of the app 2 indicating a state that exists immediately before returning to the app 1 from the app 2, to the app 1 when a transition is made from the app 2 to the app 1. For example, as the state information of the transition destination app, the screen information "ScanMenu" is transmitted. When the app 1 receives the state information of the app 2 and the state information (screen information or setting information) of the app 1 indicating a state that exists immediately before the transition, the app 1 records these pieces of information in a memory 204 or a storage device 206. Then, when the user taps again the button 303 displayed on the screen 301 of the app 1, i.e., the button 303 for transitioning to the screen 302 of the app 2, the app 1 transmits the recorded state information of the app 2 indicating a state that exists immediately before returning to the app 1, to the app 2 via the OS 207. By this, by the app 2 extracting the state information such as screen information or setting information from the received information, the app 2 can restore the state of the screen of the app 2 that exists immediately before returning to the screen 301 of the app 1.

The present embodiment can obtain the same advantageous effects as those of the first embodiment. Furthermore, as described above, when the user returns to the screen 301 of the app 1 from the screen 302 of the app 2, too, the state of the app 1 that exists immediately before transitioning to the screen 302 of the app 2 is restored in the app 1, and thus, the user can seamlessly continue his/her operation in the app 1.

In addition, in the present embodiment, by further transmitting state information of the app 2 to the app 1 when the user returns to the app 1 from the app 2 and extracting, by the app 1, the state information, when the user transitions again from the app 1 to the app 2, too, the state of the app 2 can be restored. By this, even when a plurality of applications are used alternately, the user can perform a seamless operation in each app.

Third Embodiment

In the first and second embodiments, the operation of returning to an app 1 is implemented using the launcher information of the app 1 as it is that is transmitted from the app 1 to an app 2. In the present embodiment, furthermore, a user is restrained from transitioning to an app that is not intended by him/her. Note that a description that overlaps with that of the first embodiment is omitted.

First, the first pattern (referred to as pattern A) will be described. In the pattern A, the app 2 holds a list of launcher information of applications whose links 306 are allowed to be created. Although in the present embodiment the app 2 holds a list of launcher information, the configuration is not limited thereto and the app 2 holds information by which applications allowed for a transition can be identified. In other words, the app 2 holds allowance information of applications that are allowed for a transition. In addition, the app 2 may obtain allowance information from a mobile terminal 100 or an external apparatus connected to the mobile terminal 100, instead of holding allowance information.

When the user taps a button 303 for transitioning from the app 1 being used on the mobile terminal 100 to the app 2, the app 1 being used provides launcher information of the app 2 and launcher information of the app 1 being used (transition source app), and thereby generates transition information 304 for transitioning to the app 2. The generated transition information 304 is transmitted as information 305 to the app 2 via an OS 207. At this time, the information 305 may be any as long as the information includes at least the launcher information of the app 1, and thus may be a part of the transition information 304 or may be the transition information 304 itself, or other information may be newly provided to a part or all of the transition information 304. The app 2 extracts the launcher information of the app 1 from the received information 305. When the launcher information of the app 1 has been able to be extracted, it is determined whether the launcher information of the app 1 is described in the list held by the app 2. Only when the launcher information of the app 1 is described, a link 306 for returning to the app 1 is created. Then, the app 2 displays the created link 306 on a screen 302 thereof. When the user taps the link 306 displayed on the screen 302 of the app 2, launcher information 307 for launching the app 1 is transmitted to the OS 207, by which the display screen transitions from the screen 302 of the app 2 to a screen 301 of the app 1. On the other hand, when the extracted launcher information of the app 1 is not described in the list held by the app 2, the app 2 neither creates nor displays a link 306. Note that the configuration is not limited thereto and may be such that a link 306 is created and displayed, but when the user taps the link 306, for example, a confirmation message is displayed to warn the user.

Figure 6:
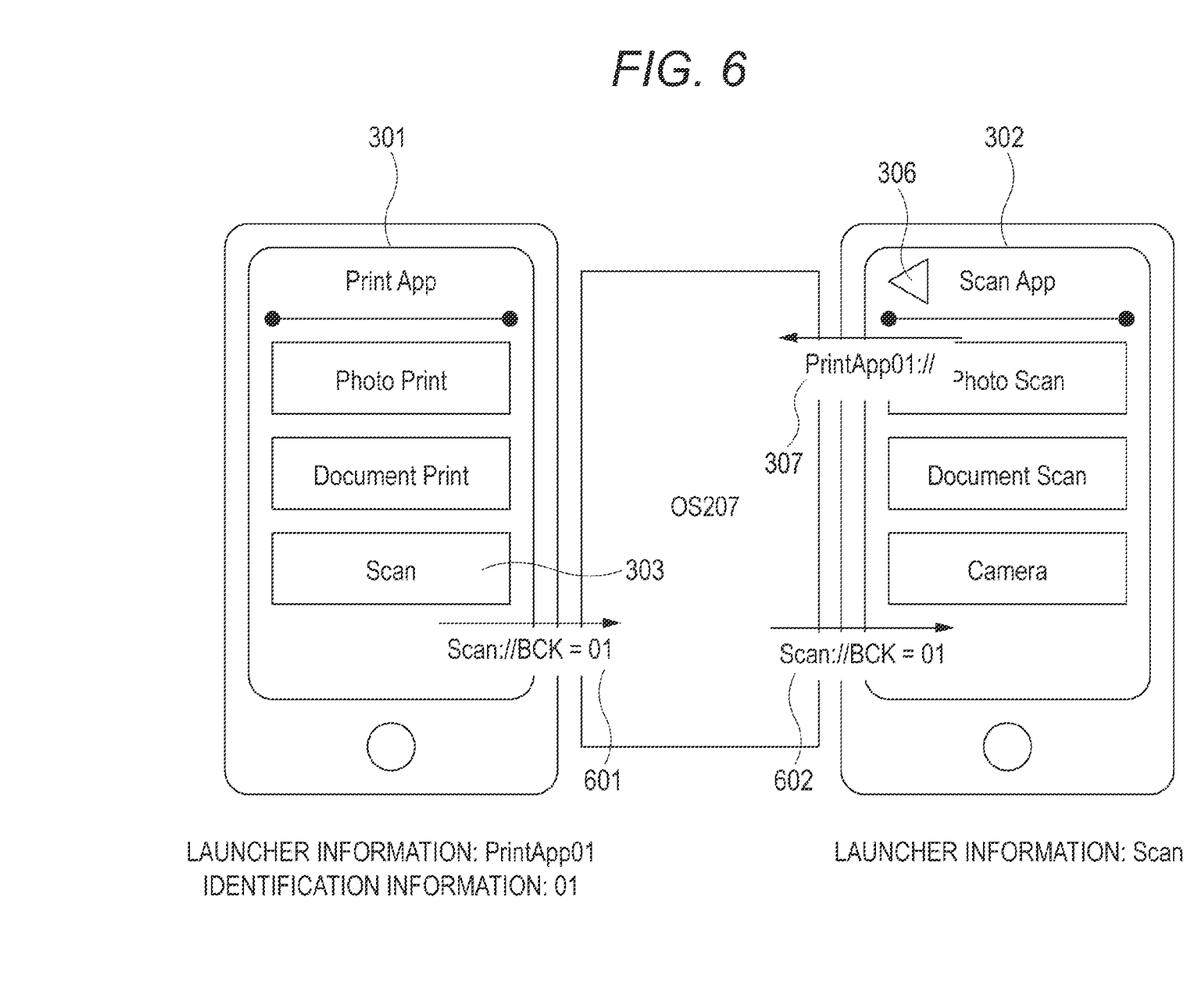
FIG. 6 is a diagram showing user operations and information to be given and received in a third embodiment.

Next, the second pattern (referred to as pattern B) will be described using FIG. 6. FIG. 6 is a diagram describing a screen transition between a transition source app and a transition destination app in the present embodiment. Specifically, FIG. 6 is a diagram schematically showing user operations and information to be given and received between the transition source app and the transition destination app when the user operations are performed. When the user taps a button 303 for transitioning from the app 1 being used on the mobile terminal 100 to the app 2, transition information 601 is generated. Specifically, the app 1 generates the transition information 601 including: identification information of the app 1 as information for identifying that it is the app 1; and launcher information of the app 2. The identification information of the app 1 may be any as long as the fact that it is the app 1 can be identified, and thus may be a part of launcher information of the app 1 or may be information completely different from the launcher information. In the present embodiment, "01" is used as the identification information of the transition source app. Namely, the transition information 601 including the identification information of the app 1 instead of the launcher information of the app 1 is generated. The generated transition information 601 is transmitted as information 602 to the app 2 via the OS 207. At this time, the information 602 may be any as long as the information includes at least the identification information of the app 1, and thus may be a part of the transition information 601 or may be the transition information 601 itself, or other information may be newly provided to a part or all of the transition information 601. The app 2 extracts the identification information of the app 1 from the received information 602. When the identification information of the app 1 has been able to be extracted, the app 2 generates launcher information of the app 1 from the received identification information of the app 1. Specifically, the app 2 adds a predetermined character string to the received identification information of the app 1, according to a predetermined rule, and thereby generates launcher information of the app 1. Note that the configuration is not limited thereto and may be such that the app 2 holds a list in which pieces of identification information of applications whose links 306 are allowed to be created are associated with pieces of launcher information, and extracts launcher information from the list. Using the generated launcher information of the app 1, the app 2 creates a link 306 for returning to the app 1. Then, the app 2 displays the created link 306 on a screen 302 of the app 2. When the user taps the link 306 displayed on the screen 302 of the app 2, launcher information 307 for launching the app 1 is transmitted to the OS 207, by which the display screen transitions from the screen 302 of the app 2 to a screen 301 of the app 1.

Figure 7A:
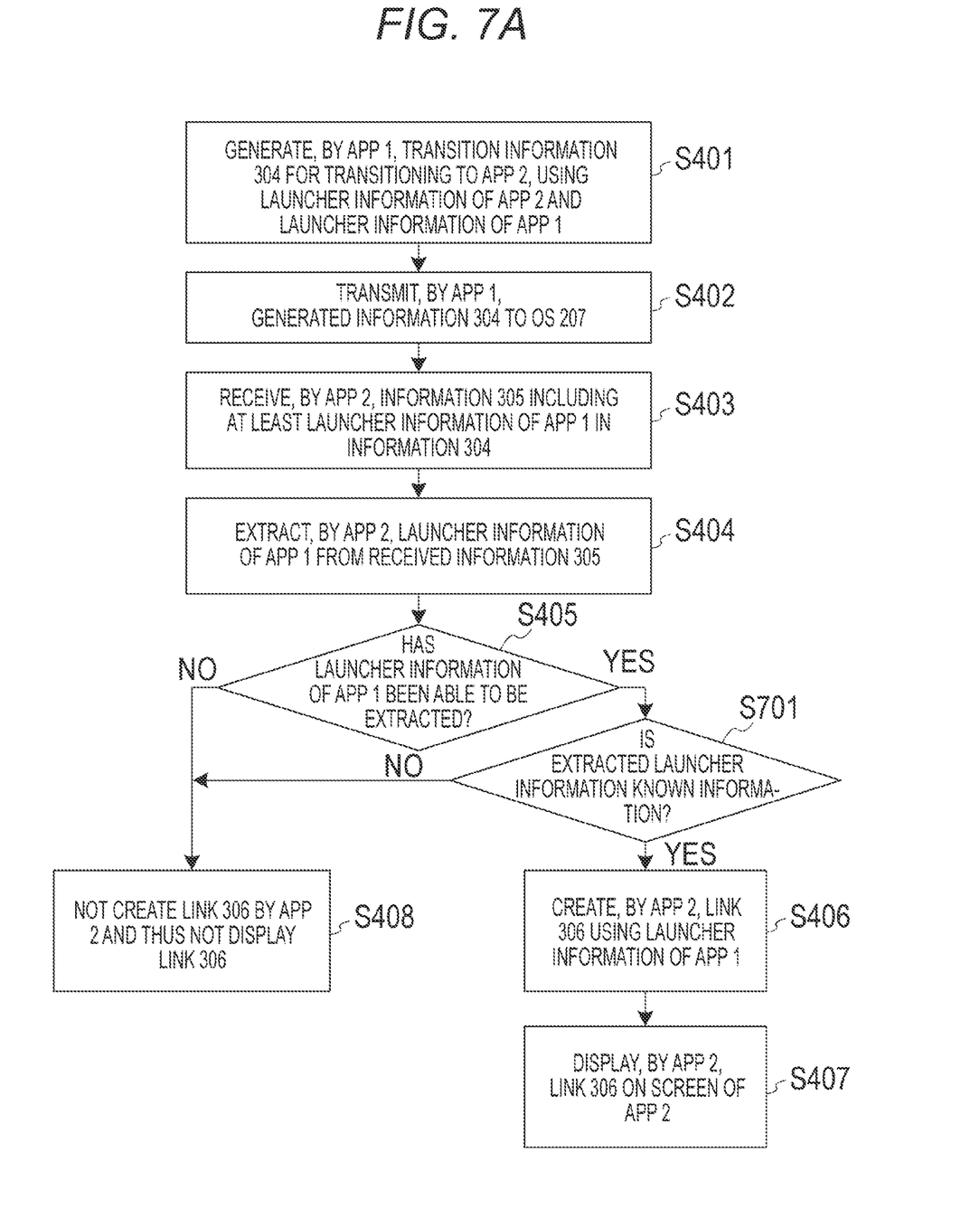
FIGS. 7A and 7B are flowcharts showing processes of applications in the third embodiment.
Figure 7B:
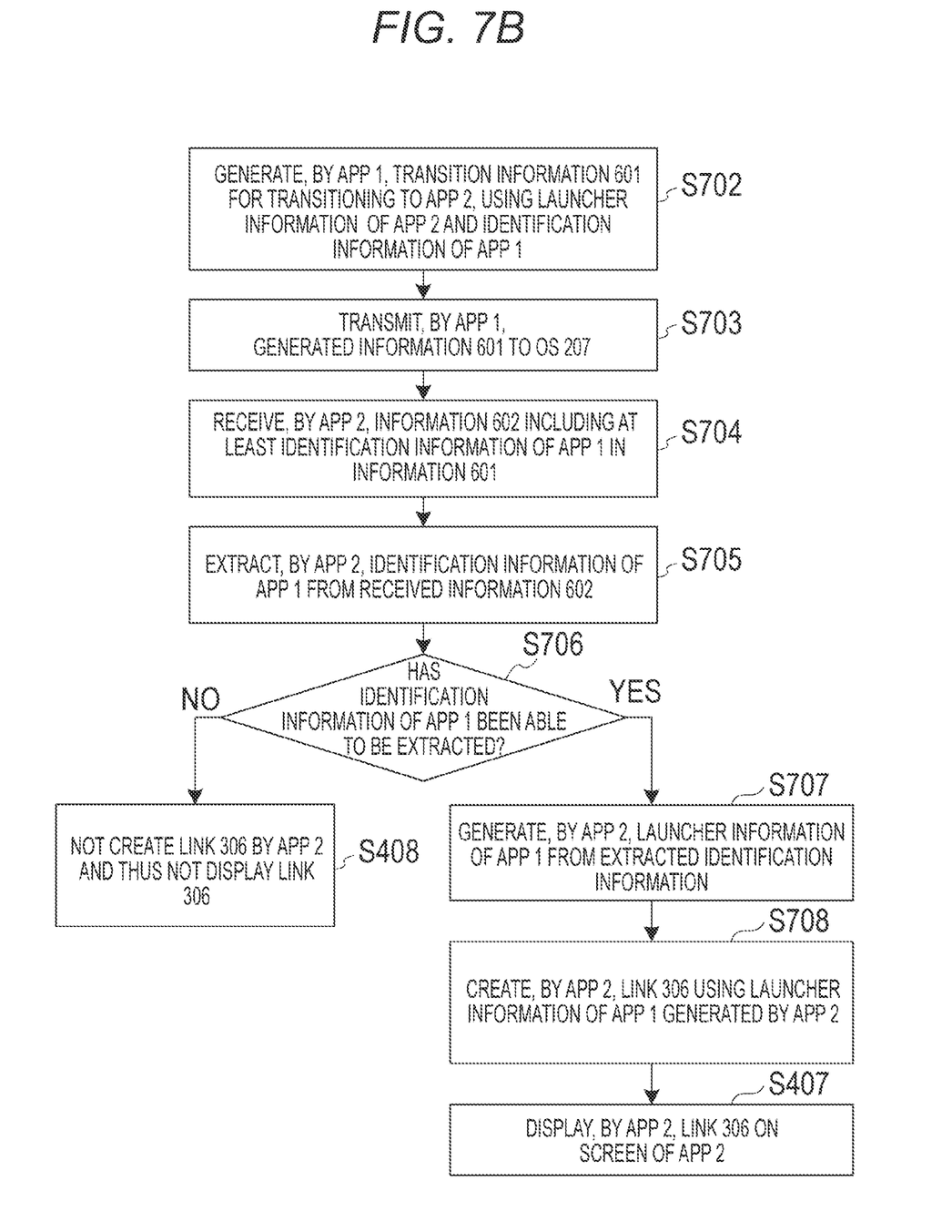

FIGS. 7A and 7B are flowcharts showing the flows of processes of the present embodiment. The flowcharts describe processes performed by the app 1 and the app 2 after the user taps the button 303 for transitioning to the app 2, which is displayed on the screen of the app 1. Note that a CPU 201 performs the flowcharts shown in FIGS. 7A and 7B by loading an application program stored in a storage device 206 into a memory 204 and executing the application program.

FIG. 7A describes processes of the pattern A as a flowchart. First, at step S401, the app 1 generates transition information 304 for transitioning to the app 2, using launcher information of the app 2 and launcher information of the app 1. Subsequently, at step S402, the generated transition information 304 is transmitted to the OS 207. At step S403, the app 2 receives information 305 including at least the launcher information of the app 1 in the transition information 304. At step S404, the app 2 extracts the launcher information of the app 1 from the received information 305. Then, at step S405, it is determined whether the launcher information of the app 1 has been able to be extracted.

If it is determined that the launcher information of the app 1 has been able to be extracted (Yes at S405), the app 2 determines at step S701 whether the extracted launcher information is information described in a list held in advance by the app 2. If the extracted launcher information is information described in the list, at step S406 the app 2 creates a link 306 for returning to the app 1, using the launcher information of the app 1. Thereafter, processing proceeds to step S407, and the app 2 displays a screen provided thereby and displays the link 306 for returning to the app 1 on the screen.

If it is determined that the launcher information of the app 1 has not been able to be extracted (No at S405), processing proceeds to step S408, and the app 2 does not create a link 306 for returning to the app 1 and thus does not display the link 306, either. Note that in this case, when the user returns to the app 1, he/she depresses a home button 102 to close the screen of the launching application and thereby returns to a display screen that displays a list of applications, and selects the app 1.

FIG. 7B describes processes of the pattern B as a flowchart. First, at step S702, the app 1 generates transition information 601 for transitioning to the app 2, using launcher information of the app 2 and identification information of the app 1. Subsequently, at step S703, the generated transition information 601 is transmitted to the OS 207. At step S704, the app 2 receives information 602 including at least the identification information of the app 1 in the transition information 601. At step S705, the app 2 extracts the identification information of the app 1 from the received information 602. Then, at step S706, it is determined whether the identification information of the app 1 has been able to be extracted.

If it is determined that the identification information of the app 1 has been able to be extracted (Yes at S706), processing proceeds to step S707, and launcher information of the app 1 is generated from the extracted identification information of the app 1. At step S708, the app 2 creates a link 306 for returning to the app 1, using the generated launcher information of the app 1. Then, processing proceeds to step S407, and the app 2 displays a screen thereof and displays the link 306 for returning to the app 1 on the screen thereof.

If it is determined that the identification information of the app 1 has not been able to be extracted (No at S706), processing proceeds to step S408, and the app 2 does not create a link 306 for returning to the app 1 and thus does not display the link 306, either. In the present embodiment, the risk of the user transitioning to an unexpected application can be reduced. For example, when the app 1 generates transition information that includes launcher information of another application (hereinafter, described as "another app") instead of information of the app 1 and transmits the transition information to the app 2, the app 2 creates a link to another app. Namely, the app 2 creates a link for transitioning to another app instead of a link for returning to the app 1. Then, when the user taps the created link, he/she transitions to another app. On the other hand, in the present embodiment, even if the app 2 receives transition information including launcher information of another app, since the app 2 does not hold the launcher information of another app, the app 2 does not create a link. Accordingly, the user can be restrained from transitioning to an unexpected app. Note that the present embodiment can also be used in combination with the second embodiment, by which usability can be improved.

Fourth Embodiment

Although in the first to third embodiments a screen transition between two applications that operate on a mobile terminal 100 is processed in each app, i.e., on the mobile terminal 100, in the present embodiment some of the screen transition processes are performed by another apparatus. Note that a description that overlaps with that of the first embodiment is omitted.

The present embodiment describes the case in which an app 2 is a web browser.

Figure 8:
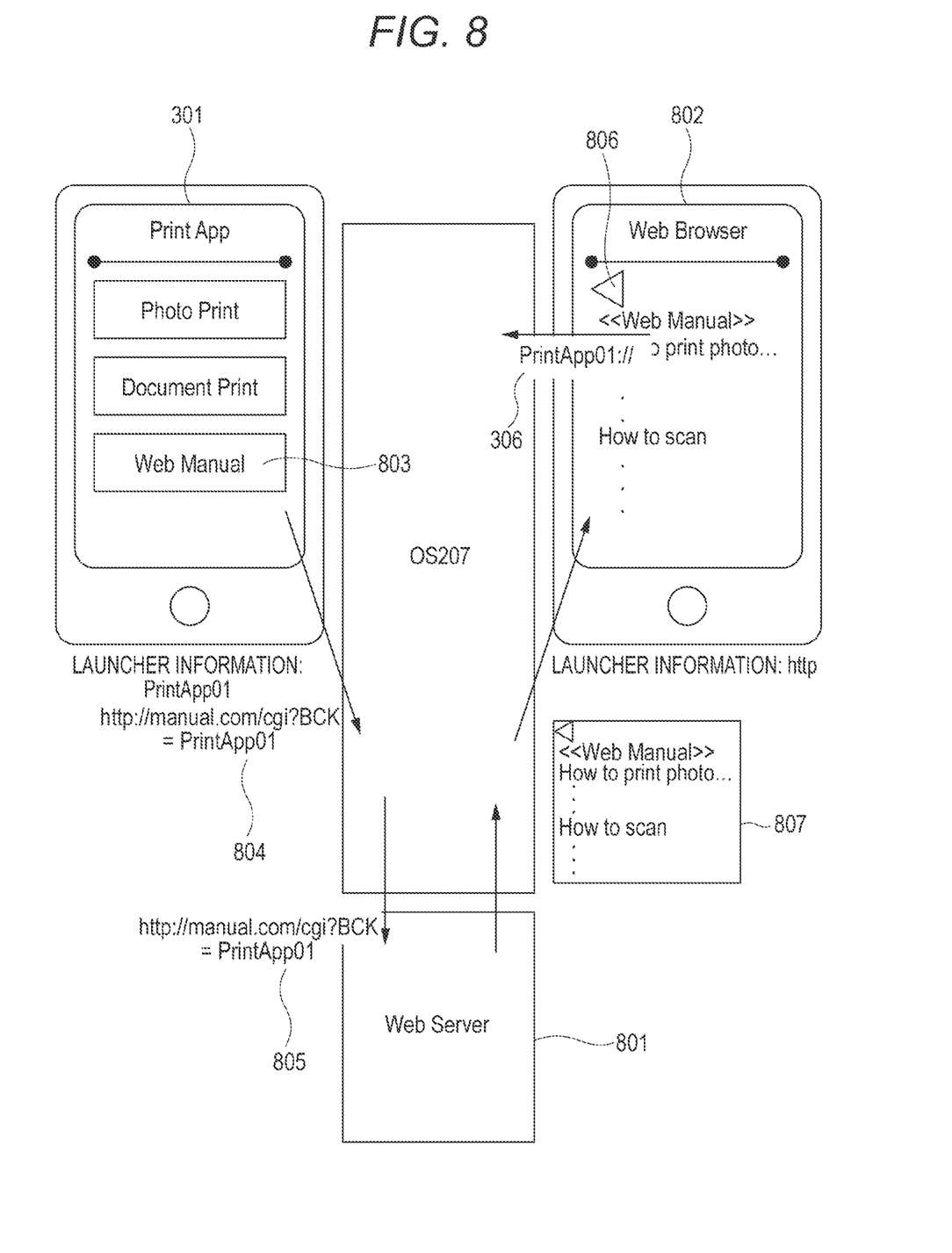
FIG. 8 is a diagram showing user operations and information to be given and received in a fourth embodiment.

FIG. 8 is a diagram schematically showing user operations and information to be given and received between an app 1, a web server 801, and a web browser when the user operations are performed in the present embodiment. When a user taps a button 803 for transitioning from the app 1 being used on the mobile terminal 100 to a screen 802 provided by the web browser (app 2), transition information 804 is generated. Specifically, the app 1 generates the transition information 804 for transitioning to the web browser, based on launcher information of the web browser and launcher information of the app 1. The transition information 804 generated by the app 1 is transmitted as information 805 to the web server 801 via an OS 207. The information 805 may be any as long as the information includes at least the launcher information of the app 1, and thus may be a part of the transition information 804 or may be the transition information 804 itself, or may be one obtained by newly providing other information to a part or all of the transition information 804. The web server 801 extracts the launcher information of the app 1 from the received information 805 to generate link information for returning to the app 1. Then, using the generated link information, the web server 801 creates a file 807 that describes display information to be displayed on the screen 802 of the web browser. The file 807 is transmitted to the web browser via the OS 207. The web browser (app 2) interprets the received file 807 and displays, based on the link information, a link 806 for returning to the app 1 on the screen 802 of the web browser. When the user taps the link 806 displayed on the screen 802 of the web browser, launcher information 306 of the app 1 is transmitted to the OS 207, by which the screen transitions from the screen 802 provided by the web browser to a screen 301 provided by the app 1. Note that in the present embodiment the sharing of processes between the web server 801 and the web browser is not limited thereto, and processes that can be processed by the web browser may be performed by the web browser instead of the web server 801.

Fifth Embodiment

The present embodiment describes a screen transition between three applications. The present embodiment describes, as an example, the case in which an app 1 is a print application, an app 2 is a scan application, and an app 3 is a camera application.

Figure 9:
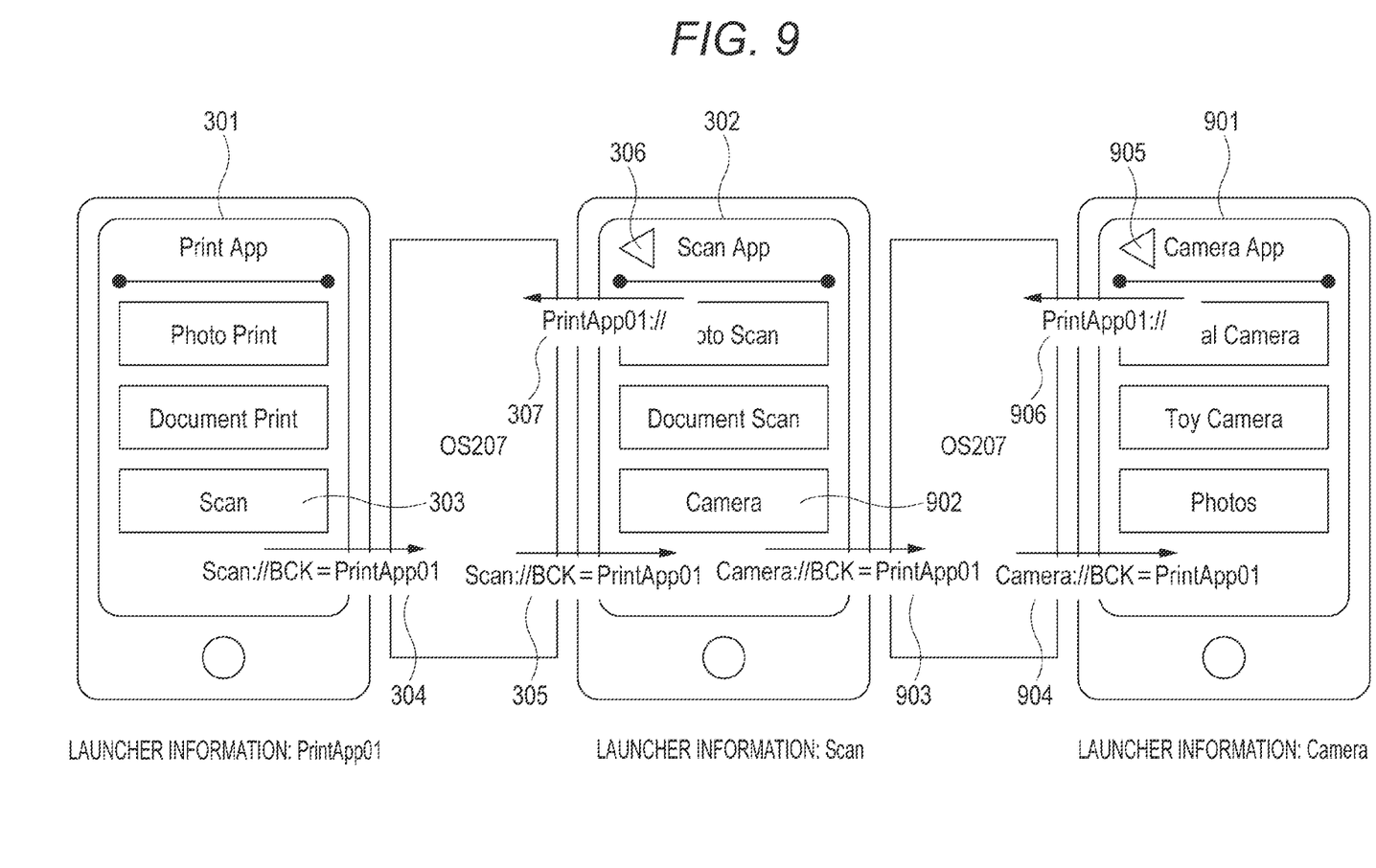
FIG. 9 is a diagram showing user operations and information to be given and received in a fifth embodiment.

FIG. 9 is a diagram describing a screen transition between a transition source app and a transition destination app in the present embodiment. Specifically, FIG. 9 is a diagram schematically showing user operations and information to be given and received between a plurality of apps when the user operations are performed in the present embodiment. When a user taps a button 303 for transitioning from the app 1 being used on a mobile terminal 100 to the app 2, the app 1 combines launcher information of the app 2 and launcher information of the app 1 together in a predetermined format, and thereby generates transition information 304 for transitioning to the app 2. The generated transition information 304 is transmitted as information 305 to the app 2 via an OS 207. The information 305 may be any as long as the information includes at least the launcher information of the app 1, and thus may be a part of the transition information 304 or may be the transition information 304 itself, or may be one obtained by newly providing other information to a part or all of the transition information 304.

The app 2 extracts the launcher information of the app 1 from the received information 305. The app 2 creates a link 306 for returning to the app 1, using the extracted launcher information of the app 1. Then, the app displays the created link 306 on a screen provided thereby. Here, the user taps a button 902 for transitioning from the app 2 having transitioned on the mobile terminal 100, to the app 3. When a screen transition is made to a screen 901 provided by the app 3, the app 2 combines launcher information of the app 3 and the launcher information of the app 1 together in a predetermined format, and thereby generates transition information 903 for transitioning to the app 3. The generated transition information 903 is transmitted as information 904 to the app 3 via the OS 207. The information 904 may be any as long as the information includes at least the launcher information of the app 1, and thus may be a part of the transition information 903 or may be the transition information 903 itself, or may be one obtained by newly providing other information to a part or all of the transition information 903. The app 3 extracts the launcher information of the app 1 from the received information 904. The app 3 creates a link 905 for returning to the app 1, using the extracted launcher information of the app 1. Then, the app 3 displays the created link 905 on the screen 901. When the user taps the link 905 displayed on the screen 901 of the app 3, launcher information 906 of the app 1 is transmitted to the OS 207, by which the display screen transitions from the app 3 to the app 1.

Note that although in FIG. 9, when a screen transition is made to the app 3, the app 2 generates the transition information 903 for transitioning to the app 3, from the launcher information of the app 3 and the launcher information of the app 1, the configuration is not limited thereto. For example, the transition information 903 may be generated by adding also the launcher information of the app 2 to the launcher information of the app 1 and the launcher information of the app 3. In this case, the app 3 extracts the launcher information of the app 1 and the launcher information of the app 2 and can thereby create links for returning to the respective applications. Alternatively, the app 3 may extract the launcher information of the app 1 and the launcher information of the app 2 to create a link for returning to the app 2, and when the link is tapped, the app 3 may transmit the launcher information of the app 2 and the launcher information of the app 1 to the OS 207. Then, the app 2 may create a link for returning to the app 1, based on the information transmitted from the app 3, and display the link for returning to the app 1 on a screen provided thereby.

In the present embodiment, when the user uses a plurality of applications in a sequential flow, he/she can return to each application. In addition, although the present embodiment describes the case of three applications, even when there are four or more applications, the user can return to each application by the same method. According to the present embodiment, usability for a transition between a plurality of applications can be improved.

OTHER EMBODIMENTS

The present invention is not limited to the above-described embodiments. For example, two or more of the methods of the first to fifth embodiments may be combined together. In addition, although in the above-described embodiments a return button is displayed as a link for returning to an app that is a transition source, the display method is not limited thereto. In addition, although in the above-described embodiments a link for returning to an app that is a transition source is displayed, the configuration is not limited thereto and may be such that the user returns to a transition source app when the process of a transition destination app ends or by the selection of an end button in the transition destination app.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus in which a first application and a second application different from the first application are able to operate, the information processing apparatus comprising:
    at least one processor operating to:
    cause a display unit to display a list screen for activating a plurality of applications including the first application and the second application, wherein the first application is a print application;
    cause the display unit to display a first screen provided by the first application in response to a first user operation in the list screen;
    cause the display unit to display a second screen provided by the second application in response to a second user operation in the list screen, wherein the second screen displayed in response to the second user operation in the list screen does not include a predetermined object for returning to the first screen;
    cause the display unit to display the second screen in response to a user operation on the first screen, wherein the second screen displayed in response to the user operation on the first screen includes the predetermined object for returning to the first screen; and
    cause the display unit to display a third screen in response to a user operation on the second screen, wherein the third screen displayed in response to the user operation on the second screen includes the predetermined object for returning to the first screen,
    wherein when the second screen is displayed in response to the user operation on the first screen, the predetermined object for returning to the first screen is displayed on the second screen, and when the second screen is displayed in response to the second user operation on the list screen, the predetermined object for returning to the first screen is not displayed on the second screen,
    wherein the first screen is displayed on the display unit in response to the user operation regardless of whether the user operation is a user operation on the predetermined object for returning to the first screen included in the second screen or a user operation on the predetermined object for returning to the first screen included in the third screen, and
    wherein a character string included in the predetermined object displayed in the second screen is the same as a character string included in the predetermined object displayed in the third screen.

2. The information processing apparatus according to claim 1, wherein whether or not the predetermined object is displayed in the second screen is changed based on whether or not the second screen is displayed via the first application.

3. The information processing apparatus according to claim 1, wherein the first screen provided by the first application and displayed in response to the user operation performed on the predetermined object is not an initial screen of the first application but a screen provided by the first application and displayed just before the second screen provided by the second application is displayed in response to the user operation performed on the first object.

4. The information processing apparatus according to claim 1, wherein the first screen provided by the first application and displayed in response to the user operation performed on the predetermined object is same as a screen provided by the first application just before the second screen provided by the second application is displayed in response to the user operation performed on the first object.

5. The information processing apparatus according to claim 1, wherein the predetermined object is not displayed under a predetermined condition, even if the second screen provided by the second application is displayed in response to the user operation performed on the first object.

6. The information processing apparatus according to claim 1, wherein the first screen provided by the first application is displayed in response to the user operation performed on the predetermined object, even if the first application is terminated while the second application is being operated.

7. The information processing apparatus according to claim 1, wherein the second application is a web browser application and the first application is an application different from the web browser application.

8. The information processing apparatus according to claim 1, wherein the predetermined object is displayed based on information generated by an operating system of the information processing apparatus.

9. The information processing apparatus according to claim 1, wherein the information processing apparatus is a smartphone.

10. The information processing apparatus according to claim 1,
    wherein the first user operation is a user operation on a first icon corresponding to the first application in the list screen,
    wherein the second user operation is a user operation on a second icon corresponding to the second application in the list screen,
    wherein the first screen provided by the first application is displayed in response to a user operation on the first icon, wherein the second screen provided by the second application is displayed in response to a user operation on the second icon, and
    wherein the second screen displayed in response to the user operation on the second icon does not include the predetermined object for returning to the first screen.

11. The information processing apparatus according to claim 1,
    wherein the user operation on the first screen is a user operation on a first object included in the first screen,
    wherein the user operation on the second screen is a user operation on a second object included in the second screen,
    wherein the second screen is displayed in response to a user operation on the first object,
    wherein the second screen displayed in response to a user operation on the first object includes the predetermined object for returning to the first screen,
    wherein the third screen is displayed in response to a user operation on the second object, and
    wherein the third screen displayed in response to a user operation on the second object includes the predetermined object for returning to the first screen.

12. An information processing method for an information processing apparatus, in which a first application and a second application different from the first application are able to operate, the information processing method comprising:
cause a display unit to display a list screen for activating a plurality of applications including the first application and the second application, wherein the first application is a print application;
cause the display unit to display a first screen provided by the first application in response to a first user operation in the list screen;
cause the display unit to display a second screen provided by the second application in response to a second user operation in the list screen, wherein the second screen displayed in response to the second user operation in the list screen does not include a predetermined object for returning to the first screen;
cause the display unit to display the second screen in response to a user operation on the first screen, wherein the second screen displayed in response to the user operation on the first screen includes the predetermined object for returning to the first screen; and
cause the display unit to display a third screen in response to a user operation on the second screen, wherein the third screen displayed in response to the user operation on the second screen includes the predetermined object for returning to the first screen,
wherein when the second screen is displayed in response to the user operation on the first screen, the predetermined object for returning to the first screen is displayed on the second screen, and when the second screen is displayed in response to the second user operation on the list screen, the predetermined object for returning to the first screen is not displayed on the second screen,
wherein the first screen is displayed on the display unit in response to the user operation regardless of whether the user operation is a user operation on the predetermined object for returning to the first screen included in the second screen or a user operation on the predetermined object for returning to the first screen included in the third screen, and
wherein a character string included in the predetermined object displayed in the second screen is the same as a character string included in the predetermined object displayed in the third screen.

13. The information processing method according to claim 12, wherein whether or not the predetermined object is displayed in the second screen is changed based on whether or not the second screen is displayed via the first application.

14. The information processing method according to claim 12, wherein the first screen provided by the first application and displayed in response to the user operation performed on the predetermined object is not an initial screen of the first application but a screen provided by the first application and displayed just before the second screen provided by the second application is displayed in response to the user operation performed on the first object.

15. The information processing method according to claim 12, wherein the first screen provided by the first application and displayed in response to the user operation performed on the predetermined object is same as a screen provided by the first application just before the second screen provided by the second application is displayed in response to the user operation performed on the first object.

16. The information processing method according to claim 12, wherein the predetermined object is not displayed under a predetermined condition, even if the second screen provided by the second application is displayed in response to the user operation performed on the first object.

17. The information processing method according to claim 12, wherein the first screen provided by the first application is displayed in response to the user operation performed on the predetermined object, even if the first application is terminated while the second application is being operated.

18. The information processing method according to claim 12, wherein the second application is a web browser application and the first application is an application different from the web browser application.

19. The information processing method according to claim 12, wherein the predetermined object is displayed based on information generated by an operating system of the information processing apparatus.

20. The information processing method according to claim 12, wherein the information processing apparatus is a smartphone.

21. The information processing method according to claim 12,
wherein the first user operation is a user operation on a first icon corresponding to the first application in the list screen,
wherein the second user operation is a user operation on a second icon corresponding to the second application in the list screen,
wherein the first screen provided by the first application is displayed in response to a user operation on the first icon, wherein the second screen provided by the second application is displayed in response to a user operation on the second icon, and
wherein the second screen displayed in response to the user operation on the second icon does not include the predetermined object for returning to the first screen.

22. The information processing method according to claim 12,
wherein the user operation on the first screen is a user operation on a first object included in the first screen,
wherein the user operation on the second screen is a user operation on a second object included in the second screen,
wherein the second screen is displayed in response to a user operation on the first object,
wherein the second screen displayed in response to a user operation on the first object includes the predetermined object for returning to the first screen,
wherein the third screen is displayed in response to a user operation on the second object, and
wherein the third screen displayed in response to a user operation on the second object includes the predetermined object for returning to the first screen.

* * * * *